United States Patent
Myers et al.

(10) Patent No.: US 9,964,043 B2
(45) Date of Patent: May 8, 2018

(54) PREMIXING NOZZLE WITH INTEGRAL LIQUID EVAPORATOR

(71) Applicant: GENERAL ELECTRIC COMPANY, Schenectady, NY (US)

(72) Inventors: Geoffrey David Myers, Greenville, SC (US); Borys Shershnyov, Moscow (RU); Andrey Subbota, Moscow (RU); Alexey Yurievich Gerasimov, Moscow (RU); Natalya Igorevna Vyazemskaya, Moscow (RU); Almaz Valeev, Moscow (RU)

(73) Assignee: General Electric Company, Schenectady, NY (US)

(*) Notice: Subject to any disclaimer, the term of this patent is extended or adjusted under 35 U.S.C. 154(b) by 412 days.

(21) Appl. No.: 14/537,973

(22) Filed: Nov. 11, 2014

(65) Prior Publication Data
US 2016/0169110 A1 Jun. 16, 2016

(51) Int. Cl.
*F02C 3/30* (2006.01)
*F02C 7/22* (2006.01)
*F23D 17/00* (2006.01)
*F23R 3/36* (2006.01)
*F23R 3/14* (2006.01)
*F23L 7/00* (2006.01)
*F23R 3/28* (2006.01)
*F23R 3/34* (2006.01)
(Continued)

(52) U.S. Cl.
CPC .............. *F02C 7/222* (2013.01); *F02C 3/30* (2013.01); *F02C 9/26* (2013.01); *F02M 25/025* (2013.01); *F23D 17/002* (2013.01); *F23L 7/002* (2013.01); *F23R 3/14* (2013.01); *F23R 3/286* (2013.01); *F23R 3/343* (2013.01); *F23R 3/36* (2013.01); *F05D 2220/32* (2013.01); *F23D 2900/00015* (2013.01)

(58) Field of Classification Search
CPC ........ F23D 17/00; F23D 17/02; F23D 11/441; F23D 17/002; F02C 9/40; F02C 7/1435; F02C 3/30; F02C 3/305; F23R 3/36; F23R 3/286; F23R 3/14; F23R 3/343
USPC ......... 239/389, 399, 400, 403, 416.4, 416.5, 239/418, 422, 423, 424
See application file for complete search history.

(56) References Cited

U.S. PATENT DOCUMENTS 3,692,245 A * 9/1972 Needham .............. B05B 1/3442
239/488
5,062,792 A * 11/1991 Maghon .................. F23C 7/004
239/400
5,085,575 A 2/1992 Keller et al.
(Continued)

OTHER PUBLICATIONS

General Electric Company, Title: eNPP 14-33 KRONOS TNG1433WATER, Dated Jan. 27, 2014, pp. 1-15.
(Continued)

*Primary Examiner* — Gerald L Sung
*Assistant Examiner* — Marc Amar
(74) *Attorney, Agent, or Firm* — Eversheds Sutherland (US) LLP

(57) ABSTRACT

The present application provides a fuel nozzle for a gas turbine engine using a primary fuel and a secondary fuel. The fuel nozzle may include a number of primary fuel injection ports for the primary fuel, a water passage, a number of secondary fuel injection ports, and a secondary fuel evaporator system for atomizing the secondary fuel.

20 Claims, 3 Drawing Sheets

(51) Int. Cl.
*F02C 9/26* (2006.01)
*F02M 25/025* (2006.01)

(56) References Cited

U.S. PATENT DOCUMENTS

| | | | |
|---|---|---|---|
| 5,295,352 A | 3/1994 | Beebe et al. | |
| 5,351,477 A | 10/1994 | Joshi et al. | |
| 5,408,825 A | 4/1995 | Foss et al. | |
| 5,511,375 A | 4/1996 | Joshi et al. | |
| 5,713,205 A * | 2/1998 | Sciocchetti | F23D 11/107 |
| | | | 239/403 |
| 5,826,423 A * | 10/1998 | Lockyer | F23C 7/008 |
| | | | 239/419.3 |
| 7,140,560 B2 | 11/2006 | Stotts et al. | |
| 7,513,100 B2 * | 4/2009 | Motter | F02C 3/30 |
| | | | 60/39.3 |
| 9,371,989 B2 * | 6/2016 | Boardman | F23D 11/16 |
| 2006/0236700 A1 | 10/2006 | Saitoh et al. | |
| 2008/0078183 A1 * | 4/2008 | Ziminsky | F23R 3/14 |
| | | | 60/776 |
| 2010/0044472 A1 * | 2/2010 | Smith | F02M 53/04 |
| | | | 239/589 |
| 2012/0073302 A1 * | 3/2012 | Myers | F23D 11/402 |
| | | | 60/748 |
| 2012/0102957 A1 | 5/2012 | Myers | |
| 2012/0117976 A1 | 5/2012 | Krull et al. | |
| 2012/0291447 A1 * | 11/2012 | Boardman | F23D 11/16 |
| | | | 60/776 |
| 2013/0186094 A1 | 7/2013 | Parsania et al. | |
| 2014/0075953 A1 | 3/2014 | Myers et al. | |
| 2014/0123671 A1 | 5/2014 | Shershnyov et al. | |
| 2014/0190168 A1 | 7/2014 | Shershnyov et al. | |

OTHER PUBLICATIONS

Andrey Subbota, et al, Title: Premixed Liquid Module (PMXO) (5-2E outer & center Nozzles), Dated Jul. 19, 2011, pp. 1-10.

* cited by examiner

PREMIXING NOZZLE WITH INTEGRAL LIQUID EVAPORATOR

TECHNICAL FIELD

The present application and the resultant patent relate generally to gas turbine engines and more particularly relate to a fuel gas premixing nozzle with an integral liquid evaporator for reduced overall water consumption and improved thermal efficiency.

BACKGROUND OF THE INVENTION

The operational efficiency and the overall power output of a gas turbine engine generally increases as the temperature of the hot combustion gas stream increased. High combustion gas stream temperatures, however, may produce higher levels of nitrogen oxides (NOx). Such emissions may be subject to both federal and state regulations in the U.S. and also may be subject to similar regulations abroad. A balancing act thus exists between the benefits of operating the gas turbine engine in an efficient high temperature range while also ensuring that the output of nitrogen oxides and other types of regulated emissions remain well below mandated levels. Moreover, varying load levels, varying ambient conditions, and other types of operational parameters also may have a significant impact on overall gas turbine efficiency and emissions.

Several types of known gas turbine engine designs, such as those using Dry Low NOx ("DLN") combustors, generally premix the flow of fuel and the flow of air upstream of a reaction or a combustion zone so as to reduce NOx emissions via a number of premixing fuel nozzles. Such premixing tends to reduce peak flame temperatures and, hence, NOx emissions.

For fuel flexibility and power system availability, low emissions gas turbines are often equipped with a system to inject a liquid fuel as a secondary or a backup fuel in addition to the gas premixers. The liquid fuel injectors may be inserted through the center of the gas premixers. Because the liquid fuel may not evaporate and premix sufficiently with the air prior to combustion, large quantities of water may be injected into the combustion zone so as to reduce the flame temperatures and the resultant NOx emissions. A significant and expensive volume of water thus may be required when operating with such a liquid fuel. Moreover, water injection may lower overall gas turbine efficiency.

There is thus a desire for an improved dual fuel premixing nozzle. Such a premixing nozzle may accommodate a secondary fuel such as a liquid fuel with reduced overall water consumption while maintaining gas turbine thermal efficiency and power generation.

SUMMARY OF THE INVENTION

The present application and the resultant patent thus provide a fuel nozzle for a gas turbine engine using a primary fuel and a secondary fuel. The fuel nozzle may include a number of primary fuel injection ports for the primary fuel, a water passage, a number of secondary fuel injection ports, and a secondary fuel evaporator system for atomizing the secondary fuel.

The present application and the resultant patent further provide a method of operating a fuel nozzle for a gas turbine engine on either a primary fuel or a secondary fuel. The method may include the steps of providing a flow of the primary fuel, providing a flow of the secondary fuel, flowing the secondary fuel through an atomizer, atomizing the secondary fuel, and combusting the atomized secondary fuel with reduced water consumption.

The present application and the resultant patent further provide a fuel nozzle for a gas turbine engine using natural gas and/or a liquid fuel. The fuel nozzle may include a number of swirler vanes with a number of natural gas injection ports for the natural gas, a water passage, a number of liquid fuel injection ports, and a liquid fuel atomizer for atomizing the liquid fuel.

These and other features and improvements of the present application and the resultant patent will become apparent to one of ordinary skill in the art upon review of the following detailed description when taken in conjunction with the several drawings and the appended claims.

DETAILED DESCRIPTION

Figure 1:
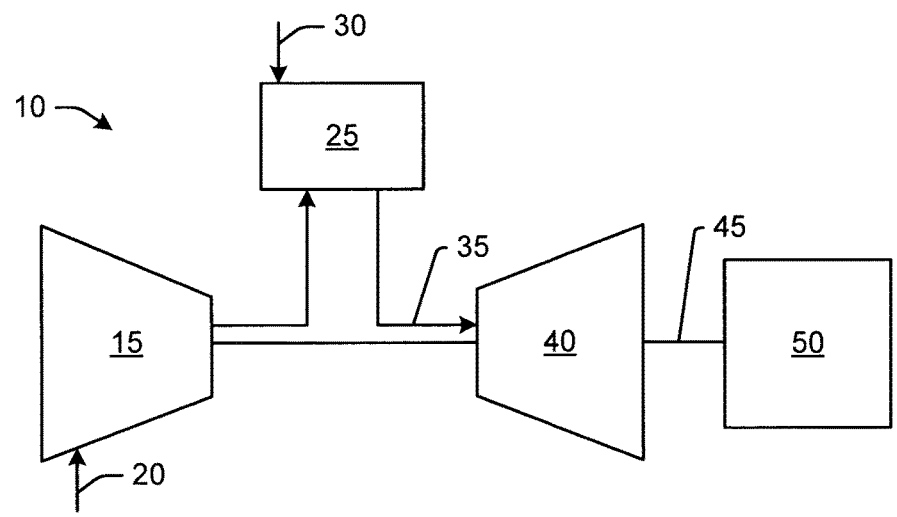
FIG. 1 is a schematic diagram of a gas turbine engine showing a compressor, a combustor, a turbine, and a load.

Referring now to the drawings, in which like numerals refer to like elements throughout the several views, FIG. 1 shows a schematic view of gas turbine engine 10 as may be used herein. The gas turbine engine 10 may include a compressor 15. The compressor 15 compresses an incoming flow of air 20. The compressor 15 delivers the compressed flow of air 20 to a combustor 25. The combustor 25 mixes the compressed flow of air 20 with a pressurized flow of fuel 30 and ignites the mixture to create a flow of combustion gases 35. Although only a single combustor 25 is shown, the gas turbine engine 10 may include any number of the combustors 25 arranged in a circumferential array or otherwise. The flow of combustion gases 35 is delivered in turn to a turbine 40. The flow of combustion gases 35 drives the turbine 40 so as to produce mechanical work. The mechanical work produced in the turbine 40 drives the compressor 15 via a shaft 45 and an external load 50 such as an electrical generator and the like.

The gas turbine engine 10 may use natural gas, liquid fuels, various types of syngas, and/or other types of fuels and blends thereof. The gas turbine engine 10 may be any one of a number of different gas turbine engines offered by General Electric Company of Schenectady, N.Y., including, but not limited to, those such as a 7 or a 9 series heavy duty gas turbine engine and the like. The gas turbine engine 10 may have different configurations and may use other types of components. Other types of gas turbine engines also may be used herein. Multiple gas turbine engines, other types of turbines, and other types of power generation equipment also may be used herein together.

Figure 2:
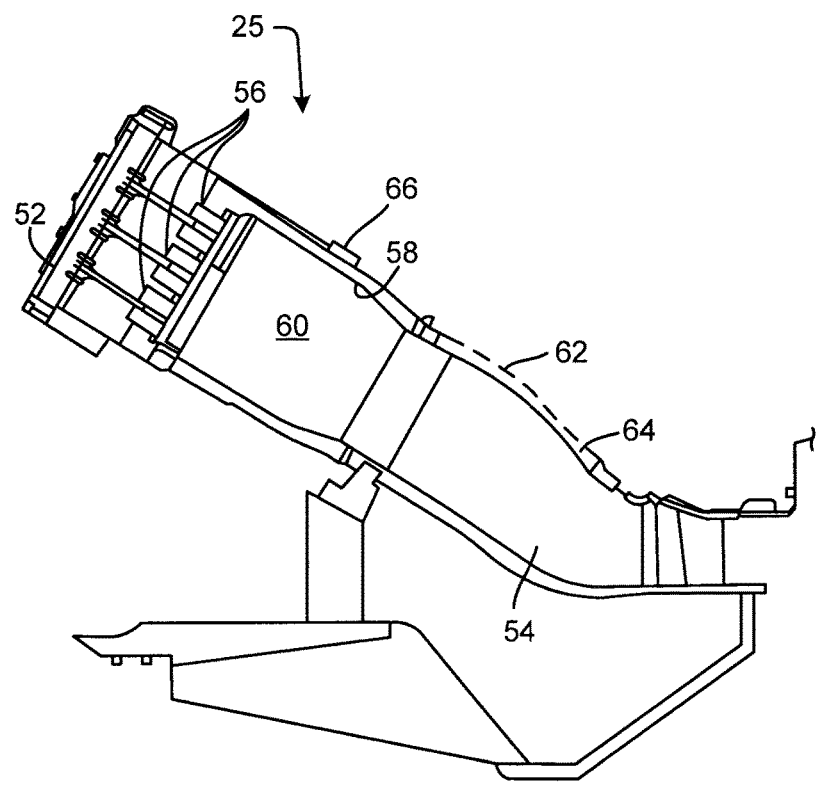
FIG. 2 is a schematic diagram of a combustor that may be used with the gas turbine engine of FIG. 1.

FIG. 2 shows a schematic diagram of an example of the combustor 25 as may be used with the gas turbine engine 10 described above and the like. The combustor 25 may extend from an end cover 52 at a head end to a transition piece 54 at an aft end about the turbine 40. A number of fuel nozzles 56 may be positioned about the end cover 52. A liner 58 may extend from the fuel nozzles 56 towards the transition piece 54 and may define a combustion zone 60 therein. The liner 58 may be surrounded by a flow sleeve 62. The liner 58 and the flow sleeve 62 may define a flow path 64 therebetween for the flow of air 20 from the compressor 15 or otherwise. An outer casing 66 may surround the flow sleeve 62 in part. Any number of the combustors 25 may be used herein in a circumferential array and the like. As described above, the flow of air 20 and the flow of fuel 30 may be ignited in the combustor 25 to create the flow of combustion gases 35. The combustor 25 described herein is for the purpose of example only. Combustors with other types of components and other configurations also may be used herein.

Figure 3:
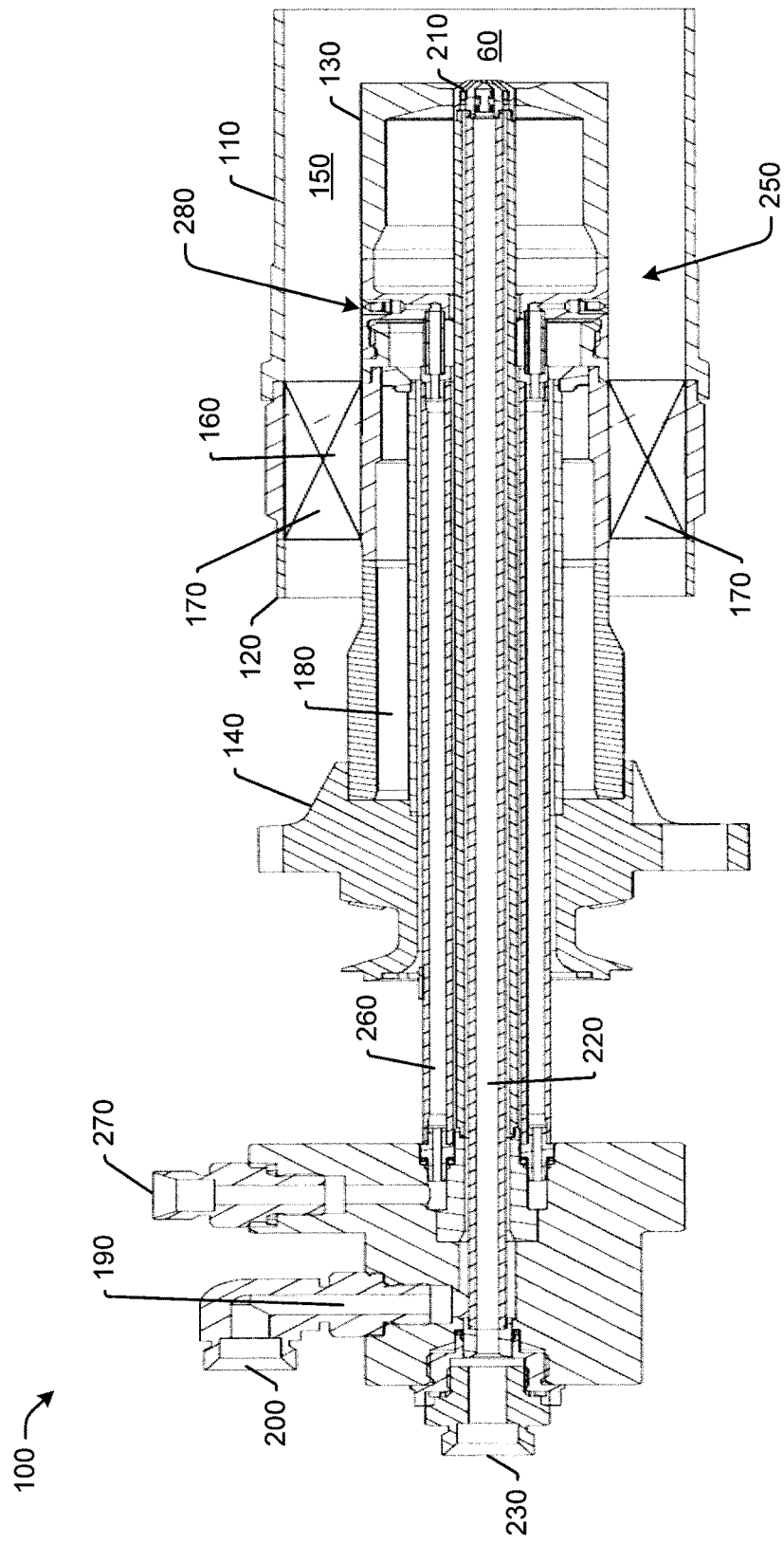
FIG. 3 is a sectional diagram of a premixing fuel nozzle as may be described herein.
Figure 4:
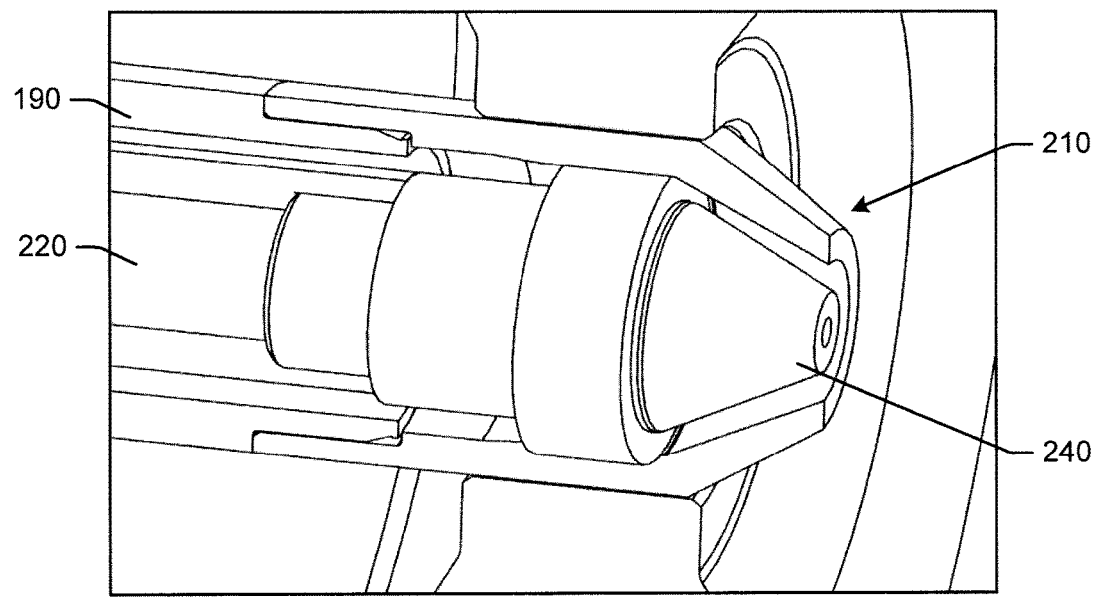
FIG. 4 is a partial sectional diagram of a pilot fuel tip that may be used with the premixing nozzle of FIG. 3.
Figure 5:
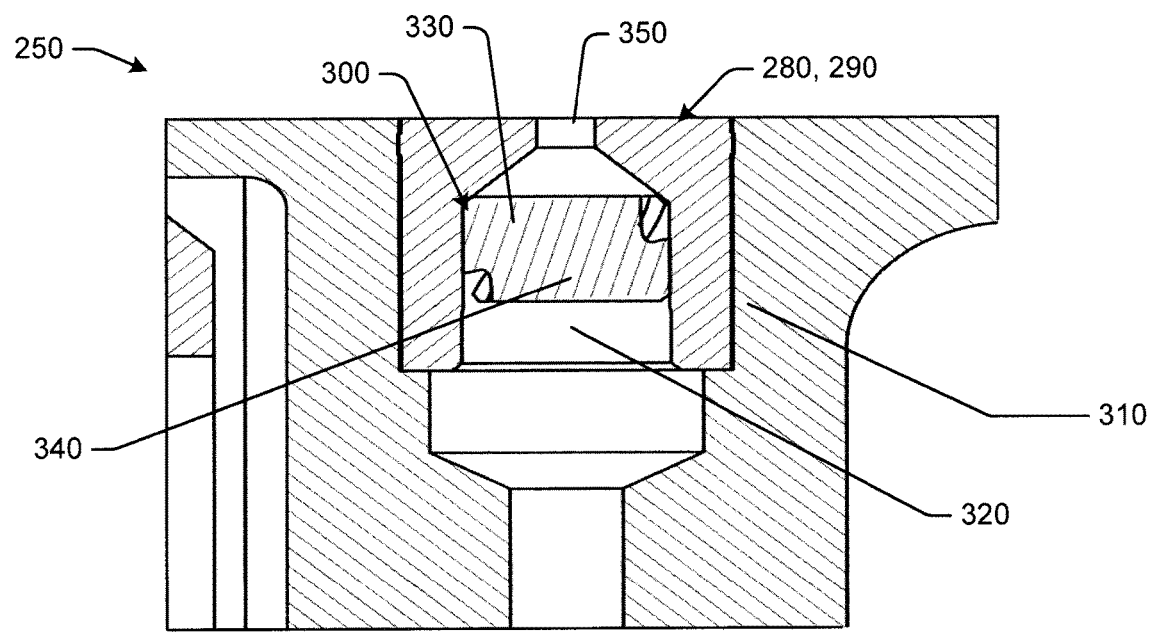
FIG. 5 is a sectional diagram of a liquid fuel injector that may be used with the premixing nozzle of FIG. 3.

FIGS. 3-5 show an example of a premixing fuel nozzle 100 as may be described herein. The premixing fuel nozzle 100 may be used with the combustor 25 and the like. The combustor 25 may use any number of the premixing fuel nozzles 100 in any configuration.

Generally described, the premixing fuel nozzle 100 may include an outer annular shroud 110. The outer annular shroud 110 may extend from an air inlet 120 on an upstream end thereof and may end about the combustion zone 60 at a downstream end thereof. The outer annular shroud 110 may surround an inner annular wall or a hub 130. The hub 130 may extend from a gas fuel nozzle flange 140 at the upstream end thereof and may end upstream of the end of the outer annular shroud 110. The outer annular shroud 110 and the hub 130 may define a premixing chamber 150 therebetween. The premixing chamber 150 may be in communication with a flow of air 20 from the compressor 15 or elsewhere. A number of swirler vanes 160 also may extend from the hub 130 to or about the outer annular shroud 110. The swirler vanes 160 may have any suitable size, shape, or configuration. A number of fuel injection ports 170 may be positioned about the swirler vanes 160. The fuel injection ports 170 may be in communication with a flow of fuel 30. The swirler vanes 160 with the injection ports 170 thus provide fuel/air mixing and premixed flame stabilization. In this example, the flow fuel 30 may be a flow of natural gas. Other types of fuels may be used herein. The flow of air 20 and the flow of fuel 30 may begin to mix within the premixing chamber 150 downstream of the swirler vanes 160 and flow into the combustion zone 60. Other components and other configurations may be used herein.

The premixing fuel nozzle 100 also may include a number of concentric tubes defining discrete annular passages for the flow of different types of fluids. The concentric tubes may have any suitable size, shape, or configuration. A gas passage 180 for a flow of a primary fuel such as natural gas may extend from the gas fuel nozzle flange 140 to the fuel injection ports 170 about the swirler vanes 160. A pilot air passage 190 may extend from a pilot air intake 200 through the hub 130 to a downstream pilot tip 210. Likewise, a pilot liquid fuel passage 220 may extend from a pilot liquid fuel intake 230 to the pilot tip 210. As is shown in FIG. 4, the pilot tip 210 may include a pilot swirler 240 therein. The pilot swirler 240 may provide for good mixing of the flow of pilot air through the pilot air passage 190 and the flow of pilot liquid fuel through the pilot liquid fuel passage 220. The pilot swirler 240 also provides thermal protection to the pilot tip 210 when fired on gas, improved atomization of the pilot fuel, and flame stabilization. The pilot liquid fuel passage 220 also may be used for flows of other types of fluids. For example, a flow of water and/or other types of fluids could be used herein. Other passages also may be used herein. Other components and other configurations may be used herein.

The premixing fuel nozzle 100 also may include a liquid fuel system 250. The liquid fuel system 250 may provide a flow of a secondary fuel such as a distillate, biodiesel, ethanol, and the like. The liquid fuel system 250 may include a liquid fuel passage 260. The liquid fuel passage 260 may extend from a premix liquid fuel intake 270 to a number of premix fuel injectors 280. In this example, six (6) of the premix fuel injectors 280 are shown although any number may be used herein. The premix liquid fuel injectors 280 may be aligned in a single plane as is shown and/or the injectors 280 may be in a staggered configuration.

Each of the premix fuel injectors 280 may be a liquid fuel atomizer 290. As is shown in FIG. 5, each liquid fuel atomizer 290 may include an inner swirler 300 positioned within an outer jacket 310. The inner swirler 300 may include a lower stem 320 leading to an upper flange 330. A number of slots 340 may be positioned within the upper flange 330. The slots 340 may be angled. Any number of the slots 340 may be used. The flow of a premix liquid fuel thus may flow through the premix liquid fuel passages 260. The upper jacket 310 may include a narrow orifice 350 therein. The premix liquid fuel may be accelerated and atomized as it flows through the slots 340 of the upper flange 330 of the inner swirler 300. The flow then again may be accelerated as it passes through the narrow orifice 350 and into the premixing chamber 150 for mixing with the flow of air 20 therein. The premix liquid fuel injectors 280 may be mounted about the hub 130 downstream of the swirler vanes 160 so as to avoid impairing the aerodynamics of the overall premixing fuel nozzle 100 or impairing the operability and/or emission compliance when operating on a gas fuel by distorting the gas fuel/air mixture profile.

In use, the premixing fuel nozzle 100 mixes a flow of the fuel 30 such as natural gas via the gas passage 180 and the fuel injection ports 170 of the swirler vanes 160 with a flow of air 20 from the compressor 15 or otherwise via the air inlet 120. The flows may be swirled downstream of the swirler vanes 160 and mixed within the premixing chamber 150 before ignition within the combustion zone 60. Likewise, a flow of pilot liquid fuel may be used at firing speed for starting the turbine on liquid fuel, to accelerate to full shaft speed, and for low partial load operations. The pilot liquid fuel may be a direct fuel injection, diffusion flame. Alternatively, a flow of water or other types of fluids also may pass through the pilot liquid fuel passage 220 or elsewhere. The water flow may provide additional emissions control as desired when operating on a liquid fuel.

The premixing fuel nozzle 100 also provides the liquid fuel system 250 with the liquid fuel atomizer 290 so as to improve the ability to evaporate a liquid fuel and mix the liquid fuel vapor with the flow of air 20. The premixing fuel nozzle 100 thus provides a two-stage liquid system incorporating injection at the pilot tip 210 or via the premix liquid fuel injectors 280 for robust ignition, acceleration to full speed no load conditions, as well as part load operations. Moreover, the premix liquid fuel injectors 280 may be used at load when emission compliance may be required.

The premixing fuel nozzle 100 also may reduce overall water consumption while improving gas thermal efficiency. The liquid fuel atomizer 290 may atomize the flow to reduce peak fuel/air ratios and temperatures in the downstream combustion zone 60. This reduction may reduce the need for water injection. Specifically, vaporizing the liquid fuel via the liquid fuel atomizer 290 may reduce the overall demand for water while remaining within emission parameters when operating on a gas fuel. Moreover, overall maintenance costs may be reduced due to avoiding the need for excess water injection as well as eliminating the cost of the water. The overall water system thus may be reduced in size and complexity. Further costs also may be reduced by using the pilot liquid fuel passage 220 for both the flow of the pilot fuel and the flow of the water as needed. Pilot water injection would be used if required to reduce further NOx emissions. Further, pilot water injection may used, for example, to meet a 25 ppm limit instead of a typically higher regulatory limit.

Specifically, the pilots may be used for making an ignitable spray at firing speed when starting on oil, and in the initial fuel transfer process from gas to liquid. The pilots are sized such that the gas turbine may be operated at 'spinning reserve' (minimum possible load) exclusively by use of the pilots. Emissions regulations generally do not require compliance below about fifty percent (50%) of full load. Once at higher load, and when the combustor inlet conditions (pressure and temperature) are high enough that the premixed flame is stable, the pilot oil circuits can be turned off and water flushed to make sure all of the oil is removed. This flush prevents thermal breakdown of the residual oil and clogging of the nozzles, which would otherwise impact reliability. If the local regulations are such that additional NOx suppression via water injection is required, that much smaller amount of water can be directly injected via the pilot circuits. If there is an issue with the turbine or the grid under these circumstances, requiring a full-load rejection (dropping hundreds of megawatts of power when the generator breaker is opened) there is no time to turn the water off and the pilots back on, as the gas turbine arrives at full speed no load conditions in a matter of seconds. The fuel flow rate must be reduced quickly, to avoid overspeed of the shaft, and yet the combustion system should remain lit to allow for a rapid recovery and re-load. The procedure would be to load reject to the center main liquid circuit. The pilot water would be turned off for a load rejection as well.

It should be apparent that the foregoing relates only to certain embodiments of the present application and the resultant patent. Numerous changes and modifications may be made herein by one of ordinary skill in the art without departing from the general spirit and scope of the invention as defined by the following claims and the equivalents thereof.

We claim:

1. A fuel nozzle for a gas turbine engine using a primary fuel and a secondary fuel, comprising:
   an inner annular wall circumscribing a longitudinal axis of the fuel nozzle;
   an outer annular shroud circumscribing at least a portion of the inner annular wall;
   a premixing chamber defined between the outer annular shroud and the inner annular wall, the outer annular shroud and the inner annular wall each extending along the longitudinal axis;
   a plurality of primary fuel injection ports for the primary fuel, the plurality of primary fuel injection ports in fluid communication with the premixing chamber;
   a water passage positioned along the longitudinal axis; and
   a secondary fuel evaporator system for atomizing the secondary fuel, the secondary fuel evaporator system comprising a plurality of atomizers positioned within the inner annular wall and extending radially outward from the longitudinal axis, wherein each atomizer of the plurality of atomizers is positioned adjacent the premixing chamber and radially inward with respect to the premixing chamber.

2. The fuel nozzle of claim 1, further comprising a plurality of swirler vanes with the plurality of primary fuel injection ports positioned thereon.

3. The fuel nozzle of claim 2, wherein the plurality of swirler vanes are positioned about the premixing chamber.

4. The fuel nozzle of claim 1, wherein the primary fuel comprises a flow of natural gas.

5. The fuel nozzle of claim 1, wherein the water passage comprises a pilot liquid fuel passage.

6. The fuel nozzle of claim 5, wherein the pilot liquid fuel passage extends to a pilot tip.

7. The fuel nozzle of claim 6, wherein the pilot tip comprises a pilot swirler thereabout.

8. The fuel nozzle of claim 1, further comprising a secondary fuel passage extending along the longitudinal axis and in fluid communication with the plurality of atomizers.

9. The fuel nozzle of claim 8, wherein the secondary fuel comprises a flow of a liquid fuel.

10. The fuel nozzle of claim 1, wherein each atomizer of the plurality of atomizers extends perpendicular to the longitudinal axis.

11. The fuel nozzle of claim 1, wherein each atomizer of the plurality of atomizers comprises an atomizer swirler.

12. The fuel nozzle of claim 11, wherein the atomizer swirler comprises a stem and a flange.

13. The fuel nozzle of claim 11, wherein the atomizer swirler comprises a plurality of slots defined therein.

14. The fuel nozzle of claim 11, wherein each atomizer of the plurality of atomizers further comprises a jacket with an orifice defined therein, wherein the atomizer swirler is positioned within the jacket, wherein a radially outer end of the jacket is flush with a radially outer surface of the inner annular wall, and wherein a radially outer end of the atomizer swirler is positioned radially inward with respect to the radially outer surface.

15. A fuel nozzle for a gas turbine engine using natural gas and/or a liquid fuel, comprising:
   an inner annular wall circumscribing a longitudinal axis of the fuel nozzle;
   an outer annular shroud circumscribing at least a portion of the inner annular wall;
   a premixing chamber defined between the outer annular shroud and the inner annular wall, the outer annular shroud and the inner annular wall each extending along the longitudinal axis;
   a plurality of swirler vanes with a plurality of natural gas injection ports for the natural gas, the plurality of natural gas injection ports in fluid communication with the premixing chamber;
   a water passage positioned along the longitudinal axis; and
   a plurality of liquid fuel atomizers positioned within the inner annular wall and extending radially outward from the longitudinal axis, wherein each liquid fuel atomizer of the plurality of liquid fuel atomizers is positioned adjacent the premixing chamber and radially inward with respect to the premixing chamber.

16. The fuel nozzle of claim 15, wherein each liquid fuel atomizer of the plurality of liquid fuel atomizers comprises an atomizer swirler.

17. The fuel nozzle of claim 16, wherein the atomizer swirler comprises a flange with a plurality of slots defined therein.

18. The fuel nozzle of claim 16, wherein each liquid fuel atomizer of the plurality of liquid fuel atomizers further comprises a jacket with an orifice defined therein, wherein the atomizer swirler is positioned within the jacket, wherein a radially outer end of the jacket is flush with a radially outer surface of the inner annular wall, and wherein a radially outer end of the atomizer swirler is positioned radially inward with respect to the radially outer surface.

19. The fuel nozzle of claim 15, wherein the water passage comprises a pilot liquid fuel passage extending to a pilot tip.

20. The fuel nozzle of claim 1, wherein each atomizer of the plurality of atomizers comprises a radially outer end positioned flush with a radially outer surface of the inner annular wall.

\* \* \* \* \*